United States Patent [19]

Anderson et al.

[11] 4,423,789
[45] Jan. 3, 1984

[54] OFFSET DISC HARROW

[75] Inventors: Charles W. Anderson; William L. Carlson, both of Henry County, Ill.

[73] Assignee: Chromalloy American Corporation, St. Louis, Mo.

[21] Appl. No.: 344,558

[22] Filed: Feb. 1, 1982

[51] Int. Cl.³ ............................................... A01B 7/00
[52] U.S. Cl. ................................................... 172/585
[58] Field of Search ................ 172/585, 584, 591–594, 172/576, 580

[56] References Cited

U.S. PATENT DOCUMENTS

| | | | |
|---|---|---|---|
| 917,455 | 4/1909 | King | 172/585 |
| 1,245,295 | 11/1917 | Willis | 172/585 |
| 2,041,216 | 5/1936 | Sjogren et al. | 172/580 X |
| 2,431,959 | 12/1947 | Olson et al. | 172/584 X |
| 2,685,159 | 8/1954 | Brundage | 172/580 |
| 2,694,279 | 11/1954 | Nelson et al. | 172/593 |
| 2,773,342 | 12/1956 | Gladis | 172/593 X |
| 3,047,075 | 7/1962 | Frank | 172/584 X |

Primary Examiner—Paul E. Shapiro
Attorney, Agent, or Firm—Haverstock, Garrett & Roberts

[57] ABSTRACT

An agricultural implement for tilling soil employing three disc gang assemblies pivotally mounted in spaced apart relationship to a support frame assembly having a hitch mechanism associated therewith for coupling to a conventional towing vehicle, the disc gang assemblies being arranged such that the front and rear disc gang assemblies are approximately equidistantly spaced from the center disc gang assembly and are offset laterally from the longitudinal axis of the support frame assembly, each of the disc gang assemblies including a plurality of spaced discing tools positioned such that the lateral working width of the center disc gang assembly is approximately equal to the combined lateral working width of the front and rear disc gang assemblies. In its preferred embodiment, the subject implement also includes an operator assembly whereby all of the disc gang assemblies may be simultaneously pivotally adjusted to vary the working angle of the discing tools relative to the soil in a range from between approximately 0° to 20°.

9 Claims, 7 Drawing Figures

OFFSET DISC HARROW

The present invention relates generally to an agricultural tillage implement and, more particularly, to an offset disc harrow designed primarily for seed bed preparation employing three disc gang assemblies wherein the center disc gang assembly is positioned in spaced apart relationship between the front and rear disc gang assemblies and operates in an angled relationship thereto; wherein the front and rear disc gang assemblies operate essentially in parallel with each other and each is offset laterally from the center of the implement; and wherein the lateral working width of the center disc gang assembly is substantially equal to the combined working width of the front and rear disc gang assemblies so that a full working of the soil is achieved and no net lateral displacement of the soil is realized. The present invention also includes means whereby all three disc gang assemblies may be simultaneously adjusted to vary the aggressiveness of the disc blades with the soil. Although it is anticipated that the present device will be used primarily for seed bed preparation preparatory to planting, the present device can also be utilized for many other conventional discing operations.

Many different types of cultivating implements such as disc harrows are available and have been employed for use in preparing and cultivating seed beds after primary or secondary tillage has been achieved by a deep tillage implement such as a conventional moldboard plow. Conventional disc harrows normally employ a forward gang of discs and a rear gang of discs positioned in either a tandem or offset disc arangement and the disc blades usually include particular surface profiles depending upon the crop to be planted. See for typical examples the constructions shown in U.S. Pat. Nos. 2,613,491; 2,908,336; 2,923,363; 2,952,325; and 4,279,311. The known disc harrow constructions for the most part are characterized by complicated and cumbersome mechanisms utilized for either controlling the angular displacement of the individual disc gangs relative to the supporting frame; controlling the desired penetration of the soil by the discing tools; or allowing the individual disc gangs to tilt or move independently of each other so that the implement may pass over rough or uneven terrain without forcing portions of the harrow to unnecessarily penetrate or gouge the soil.

Although the various mechanisms disclosed in the above-identified patents have attempted to improve the effectiveness and efficiency of a discing operation, many disadvantages and shortcomings still exist. For example, a typical problem associated with the use of conventional disc harrows, especially a tandem type disc harrow, has been the uneven cutting of the soil across the entire working width of the discing implement. Use of such harrows generally leaves untilled soil or a ridge of soil, commonly called a balk, between the laterally positioned disc gangs after passage of the implement thereby requiring further tillage for completion of the task. The uneven tillage of the soil is directly related to the arrangement of the various disc gangs and the working angle of the disc blades relative to the direction of travel of the implement. This problem is accented during turns and other maneuvering of the discing implement behind a towing vehicle and considerably reduces the overall efficiency of the discing operation.

Another operational disadvantage associated with the use of most offset type disc harrows is that the side draft of soil created by the passage of the forward gang of discs is not completely offset by the side draft created by passage of the rear gang of discs. This causes uneven displacement of the soil and effectively reduces the ability of the implement to completely work the soil. In addition, most of the prior art constructions utilize a substantially complicated mechanism for angularly adjusting the working angle of the disc gang assemblies relative to the direction of travel of the implement, and none of the known constructions provide easily accessible means for simultaneously adjusting the angular position of all of the disc gang assemblies to vary the aggressiveness of the disc blades with the soil. For these and other reasons, the known disc harrow constructions have not been totally satisfactory.

The present device solves many of these problems and overcomes many of the disadvantages and shortcomings associated with conventional discing implements and teaches the construction and operation of a relatively simple offset disc harrow which is specifically designed to achieve a full and complete working of the soil with a single pass. The present disc implement includes a support frame assembly having means thereon for coupling to a conventional tractor or other suitable vehicle so that the implement can be easily and conveniently towed during a discing operation. Three separate disc gang assemblies are pivotally mounted in spaced apart relationship with each other to the support frame assembly. The center disc gang assembly is approximately equidistantly spaced between the front and rear disc gang assemblies and operates in an angled relationship thereto. The front and rear disc gang assemblies operate essentially in parallel with each other and each is offset laterally from the longitudinal axis of the implement such that the front disc gang assembly is positioned forward of and substantially in alignment with one end portion of the center disc gang assembly, and the rear disc gang assembly is positioned aft of and substantially in alignment with the opposite end portion thereof, the center disc gang assembly having a cutting or working width approximately equal to the combined working width of both the front and rear disc gang assemblies. In addition, all of the disc blades on both the front and rear disc gang assemblies are positioned to face one lateral direction and all of the disc blades on the center disc gang assembly are positioned to face the opposite lateral direction so that no net lateral displacement of the soil is realized. This specific offset arrangement achieves a full and complete working of the soil and eliminates both the side draft problems associated with conventional offset discing implements and the ridge or balk problems generally associated with conventional tandem discing implements. This also eliminates the need for a balk buster which is generally mounted onto the main frame of the implement between the tandem gangs and is specifically designed to cut out the ridge or balk normally left between the laterally positioned disc gangs.

Additionally, a relatively simple linkage mechanism interconnects all three disc gang assemblies and includes manually operable means on the front disc gang assembly for pivotally rotating all of the disc gang assemblies to vary the aggressiveness of the disc blades with the soil. Each of the disc gang assemblies are pivotally movable between a first position and a second position angularly related thereto, and means are provided on the support frame assembly for limiting the rotational movement of the disc gang assemblies to an angular displacement in the range from between approximately 0° to 20°. Additional means are also provided for selectively controlling the angular displacement of the disc gang assemblies between their first and second movable positions. In the preferred embodiment, the linkage mechanism is also coupled to the various gang assemblies in such a manner that, when the angular position of one of the disc gang assemblies is adjusted, the remaining disc gang assemblies are likewise simultaneously adjusted such that the angular displacement of each of the individual disc gang assemblies from their respective first movable position is substantially equal. This angular relationship between the various disc gang assemblies ensures a full working of the soil and substantially eliminates the side draft and balk problems associated with conventional discing implements. Alternatively, each of the disc gang assemblies may also be mounted to the support frame assembly so as to be independently adjustable relative to each other. Hydraulic means operable from the seat of the tractor or other towing vehicle may also be utilized for angling the disc gang assemblies.

It is therefore a principal object of the present invention to provide a simple, more efficient offset discing implement for effectively achieving a full working of the soil such that a smoother, finished seed bed is obtained preparatory to planting.

Another object is to teach the construction and operation of a discing implement which substantially eliminates the side draft problems associated with conventional offset type disc harrows.

Another object is to teach the construction and operation of a discing implement which substantially eliminates the untilled areas generally left behind a conventional tandem type disc harrow.

Another object is to provide a discing implement which utilizes relatively simple means readily accessible and manually operable from the front portion of the implement for pivotally adjusting the angular position of the disc gang assemblies relative to the working soil.

Another object is to teach the construction and operation of a discing implement which enables a user to easily, quickly, and simultaneously adjust the angular position of the disc gang assemblies such that the angular displacement of each of the individual disc gang assemblies from their respective first movable position is substantially equal.

Another object is to provide a relatively simple discing implement which is highly manueverable and can be easily and economically produced.

Another object is to provide an offset disc harrow wherein the front and rear disc gang assemblies are each offset from the longitudinal axis of the implement and operate essentially in parallel with each other, and wherein the cutting or working width of the center disc gang assembly is approximately equal to the combined working width of the front and rear disc gang assemblies and operates in an angled relationship thereto.

These and other objects and advantages of the present invention will become apparent to those skilled in the art after considering the following detailed specification of the present device in conjunction with the accompanying drawings, wherein.

Figure 1:
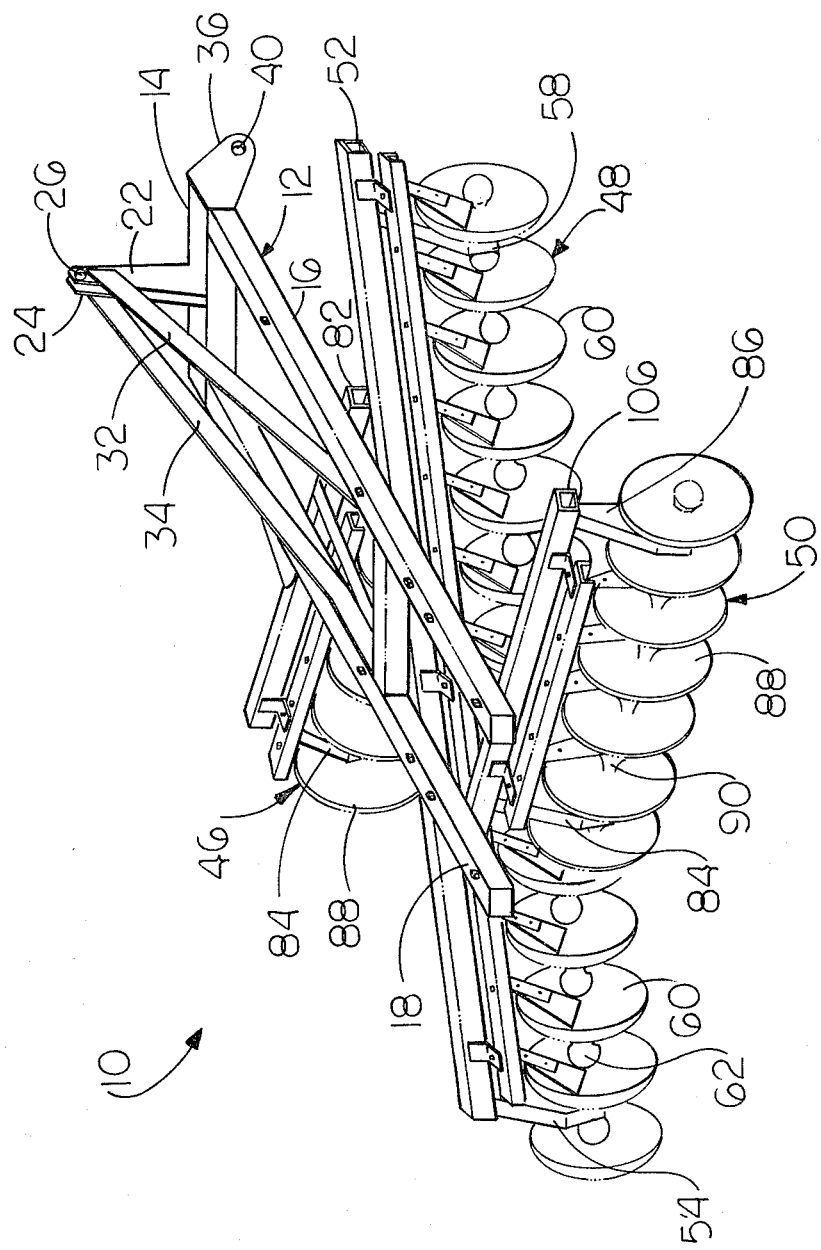
FIG. 1 is perspective view of an offset disc harrow constructed according to the teachings of the present invention.

Referring to the drawings more particularly by reference numbers and wherein like numerals refer to like parts, number 10 in FIG. 1 refers generally to an offset disc harrow constructed according to the teachings of the present invention. The discing device 10 includes a support frame assembly 12 (FIG. 3) having coupling means associated therewith for operatively attaching the present device to a towing vehicle as will be hereinafter explained. Although a wide variety of varying structural configurations of the frame assembly 12 may be utilized in the practice of the present invention, in its preferred embodiment, support frame assembly 12 is substantially U-shaped in configuration and includes a structural cross-member 14 and side frame members 16 and 18 extending rearwardly therefrom. An additional cross-member 20 is positioned at an intermediate location along and between the side frame members 16 and 18 and has its opposite end portions rigidly secured to the members 16 and 18 respectively. The cross-member 20 provides additional stability and rigidity to both members 16 and 18 and to the entire discing implement 10. In addition, the member 20 is also utilized to pivotally mount the center disc gang assembly as will be more fully explained hereinafter.

Although it is recognized that any well known materials of construction may be utilized in fabricating the support frame assembly 12, it is generally preferred that the frame members 14, 16, 18, and 20 be constructed of heavy structural steel to ensure maximum strength and stability. Heavy structural steel is preferred over flat steel, angle iron, and channel iron because heavy structural steel is designed to withstand the twisting and bending loads commonly encountered during discing operations. The entire support frame assembly 12 can be easily and conveniently molded into a unitary structure from conventional steel moldings or it can be easily fabricated from tubular steel sections which are dimensioned and welded or otherwise joined together to form a unitary structural configuration.

Although any well known suitable coupling means may be utilized for attaching the implement 10 to a conventional tractor or other towing vehicle, in its preferred embodiment, the subject implement includes a releasable hitch arrangement specifically designed to accommodate towing vehicles utilizing a three-point lift attachment such as a Category I 3-Point hitch. The hitch arrangement utilized in the present construction includes a pair of angularly disposed flanged members 22 and 24 securely mounted in spaced apart relationship to the central portion of the cross-member 14 as shown in FIG. 3. The members 22 and 24 extend forwardly and upwardly from the member 14 and are sufficiently spaced such that the center link or upper lift attachment arm (not shown) connected to the towing vehicle may be easily positioned therebetween. Apertures 26 and 28 are located at the upper end portion of the members 22 and 24 respectively and are in such reasonable alignment that, when the upper lift attachment arm associated with the towing vehicle is positioned therebetween, an attachment pivot pin such as the pivot pin member 30 (FIG. 2) may be readily inserted in a transverse direction through the apertures 26 and 28 and through the opening provided in the upper lift arm thereby pivotally attaching the upper lift arm to the flange members 22 and 24. After insertion, the pin member 30 may be retained in proper position by any suitable means such as by keys, pins, nuts, and other similar known devices. A pair of angularly disposed supporting members 32 and 34 having their opposite end portions rigidly secured to the side frame members 16 and 18 and to the opposed flange members 22 and 24 respectively are utilized in order to provide additional stability and rigidity to the members 22 and 24. Support members 32 and 34 may likewise be attached in any conventional manner such as by welding, threaded members, and any other conventional fastening means.

Figure 2:
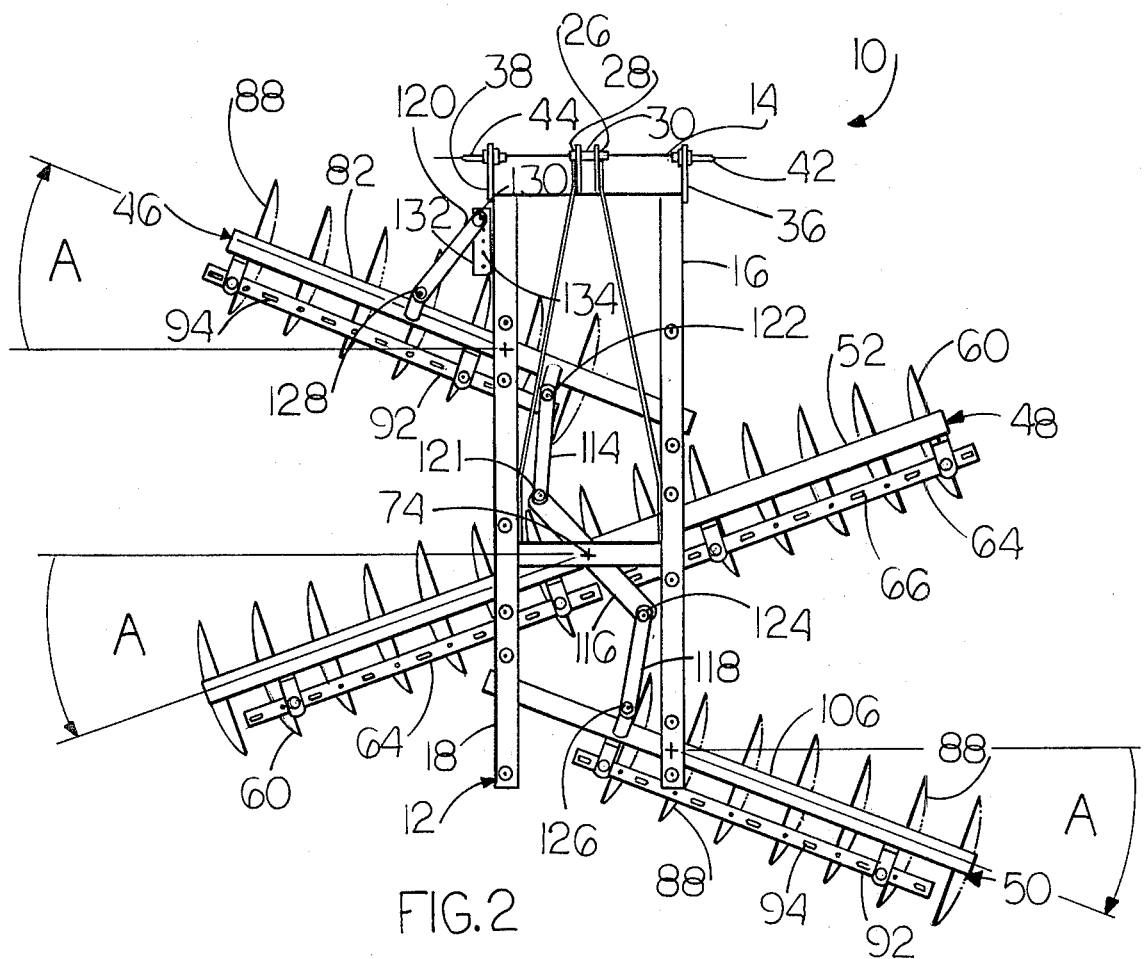
FIG. 2 is a top plan view of the discing implement of FIG. 1 showing the angular relationship between the individual disc gang assemblies.
Figure 3:
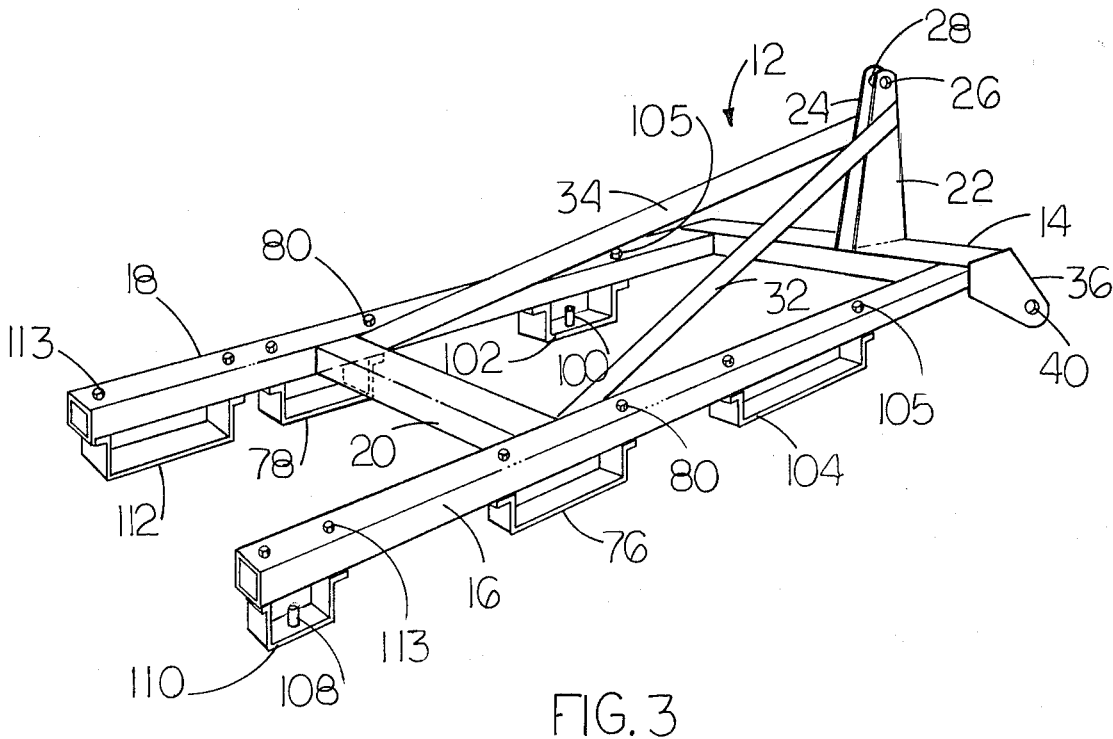
FIG. 3 is a perspective view of the support frame assembly to which the pivotally mounted disc gang assemblies are attached.

Additional flange members 36 and 38, each of which has an aperture 40 extending therethrough, are sturdily affixed to the opposite end portions of the cross-member 14 by any suitable fastening means as shown in FIGS. 2 and 3. The members 36 and 38 extend forwardly and downwardly from the respective end portions of the cross-member 14 and are disposed in substantially parallel relationship with each other such that when the lower lift attachment arms (not shown) associated with the towing vehicle are placed in close abuting relationship therewith and the respective apertures 40 are sufficiently aligned with the respective openings in the corresponding attachment arms, the lower lift attachment arms may be pivotally attached to the members 36 and 38 by inserting the pivot pin members 42 and 44 respectively therethrough to complete the three-point connection. After insertion, the attachment pin members 42 and 44, like the pin member 30, may be retained therein by any suitable means. Once the support frame assembly 12 is pivotally connected to the three-point lift attachment mechanism of the towing vehicle as described, the subject implement 10, through hydraulic assist or other means, may be pivotally rotated about the pivot pin members 30, 42, and 44 between a ground engaging operative discing position and an elevated transport position angularly related thereto.

Figure 5:
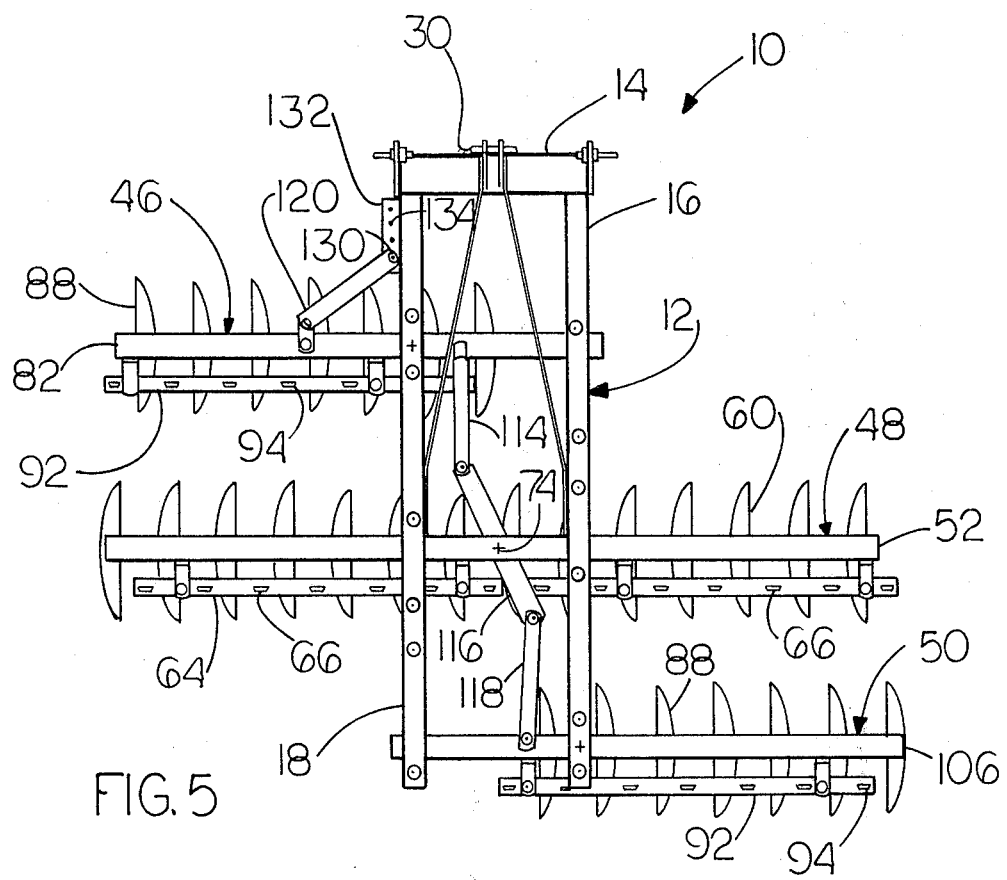
FIG. 5 is a top plan view of the discing implement of FIG. 1 wherein the individual disc gang assemblies are adjusted to their in-parallel or first movable positions.
Figure 6:
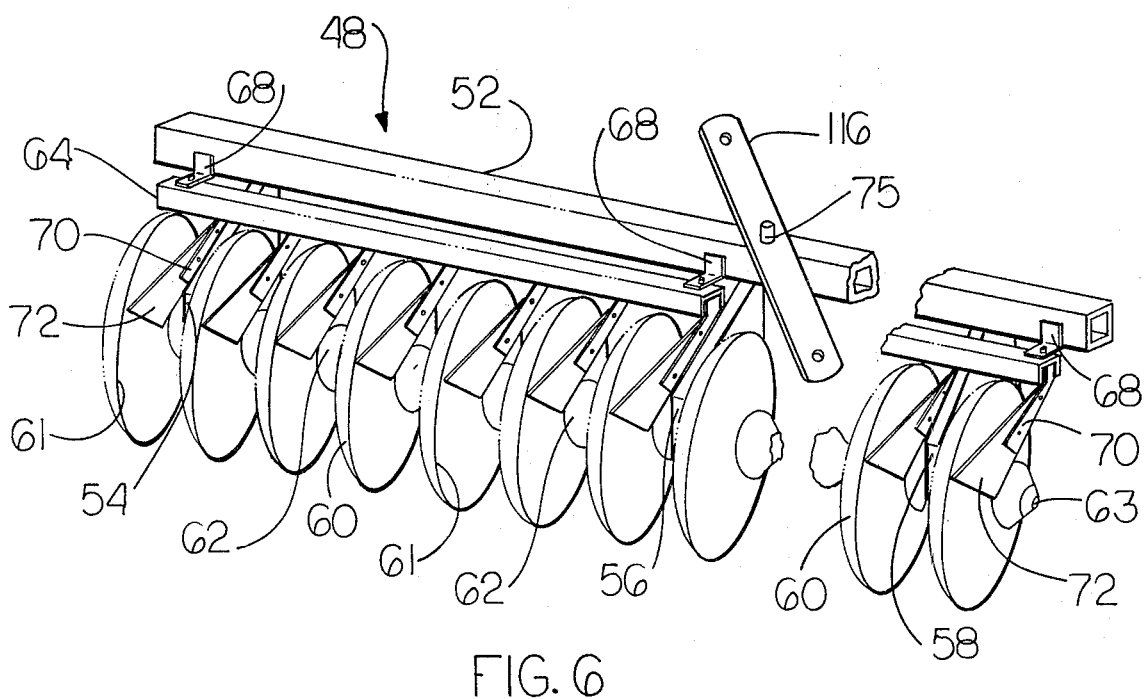
FIG. 6 is a fragmentary perspective view of the center disc gang assembly utilized in the present device.

The frame assembly 12 supports the three disc gang assemblies 46, 48, and 50 as shown in FIGS. 1, 2, and 5. The front and rear disc gang assemblies 46 and 50 are approximately equidistantly spaced from the center disc gang assembly 48 and are positioned on laterally opposite sides of the longitudinal axis of the implement 10 as best shown in FIGS. 2 and 5. The center disc gang assembly 48 includes a gang tube or bar 52 having three downwardly extending arm members 54, 56, and 58 equally positioned along the entire length thereof as shown in FIG. 6. The gang bar 52 is preferably constructed from tubular steel similar to the construction of the support frame assembly 12, and the members 54, 56, and 58 may be either integrally formed therewith or otherwise mounted to the gang bar 52 by any suitable means. The members 54, 56, and 58 also include means located at each end portion thereof for attaching to the discing tools in a conventional manner. A plurality of equally spaced identically shaped discs or disc blades 60, each of which having a substantially circular sharp cutting edge 61, are mounted in axially aligned relation on a common axial support shaft or axle 63 and are equidistantly spaced thereon by positioning therebetween, in a conventional manner, spacer sleeves or spools such as the spool members 62. The disc blades 60 are concaved in shape and the concavity of the blades may be selected depending upon the speed and penetration desired. The disc blades 60 are also spaced lengthwise along the axle 63 sufficiently to avoid plugging by the soil or surface residue during discing. The spacer spools are preferably machined to the concavity of the disc blades 60 to assure proper fit and bearing alignment. The downwardly extending arm members 54, 56, and 58 attach to the axle 63 in a conventional fashion.

Optional disc blade scraper assemblies may also be utilized in association with the disc blades 60 to scrape the inner concave surfaces of the blades so as to remove dirt and debris therefrom in a known manner. To facilitate installation of the scraper assemblies, a pair of scraper bars 64, each having a plurality of openings 66 equally spaced therealong, are securely mounted in aligned relation to the rear portion of the center gang bar 52 such that the bars 64 extend substantially the full length of the center gang assembly 48 as shown in FIGS. 2, 5, and 6. The bars 64 may be mounted to the member 52 by any suitable means such as by utilizing a plurality of L-shaped brackets such as the bracket members 68. Angularly disposed scraper arm members 70 are threadedly secured to the scraper bar 64 at each respective opening 66, and corresponding scraper blades 72 are securely attached thereto such that each respective blade 72 lies in close proximity to the concaved portion of each respective disc blade 60. The openings 66 are positioned respectively between each adjacent pair of discs 60 and are offset laterally from the inner concave surface of each disc as shown in FIGS. 2 and 5. In addition, the openings 66 are also elongated so that the scraper blades 72 may be laterally adjusted depending upon the type and condition of the soil to be worked. If installed, the scraper blades 72 should be positioned to allow maximum clearance for trash, grass, and other residue to feed through the discs, yet they should be sufficiently spaced from the disc blades to prevent the disc blades from clogging in heavy, sticky, and/or waxy soils.

Figure 7:
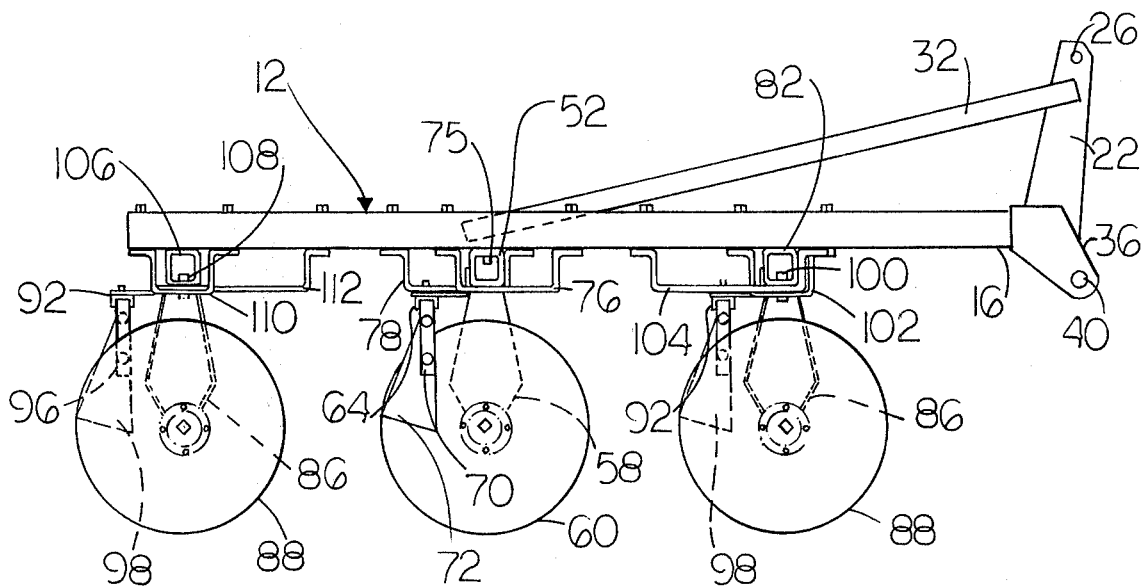
FIG. 7 is a side elevational view of the discing implement of FIG. 5.

The center disc gang assembly 48 is pivotally mounted at 74 to the central portion of the cross-member 20 by any suitable pivot means and is rotatably movable thereabout between a first position wherein all of the disc gang assemblies are disposed in parallel relationship which each other as shown in FIG. 5 and a second position angularly related thereto as shown in FIG. 2. Typical of such pivot means includes use of a pivot pin member 75 (FIG. 6) which is cooperatively engageable with the underside portion of the cross-member 20 so as to permit rotational movement of the center disc assembly 48 thereabout. The pin member 75 may be attached to or integrally formed with either the center gang bar 52 or the arm member 116 as will be hereinafter explained. Other similar pivot means known in the art such as a turn buckle arrangement or a ball and socket type connection may likewise be utilized. Once the disc gang assembly 48 is pivotally attached to the member 20, a pair of similarly dimensioned U-shaped brackets 76 and 78 are positioned and mounted to the side frame members 16 and 18 such that the center gang bar 52 lies between the side frame members 16 and 18 and the bracket members 76 and 78 and extends through the space formed therebetween as best shown in FIG. 7. The bracket members 76 and 78 are dimensioned lengthwise such that when the gang bar 52 is pivotally rotated about its pivot means 75, the disc gang assembly 48 is moved away from its in-parallel position as shown in FIG. 5 and is angularly displaced therefrom so as to subtend an angle in the range from between approximately 0° to 20°. The U-shaped brackets 76 and 78 are mounted to the members 16 and 18 such as by the threaded members 80 and are offset from each other such that the forward end portion of the bracket 78 lies substantially adjacent to the forward portion of the cross-member 20 and the rear portion of the bracket 76 lies substantially adjacent to the rear portion of the member 20. This offset arrangement of the brackets 76 and 78 allows the center gang assembly 48 to be pivotally rotated in substantially one direction from its first or in-parallel position as shown in FIG. 5 to its second angularly related position as shown in FIG. 2 and, when said brackets are dimensioned as previously described, they also allow pivotal movement of the center gang assembly in a range from between approximately 0° to 20°. It should also be noted that the scraper bars 64 are positioned such that they lie below the bracket members 76 and 78 and do not interfere with or otherwise hinder the rotational movement of the gang bar 52 within the bracket members 76 and 78.

Figure 4:
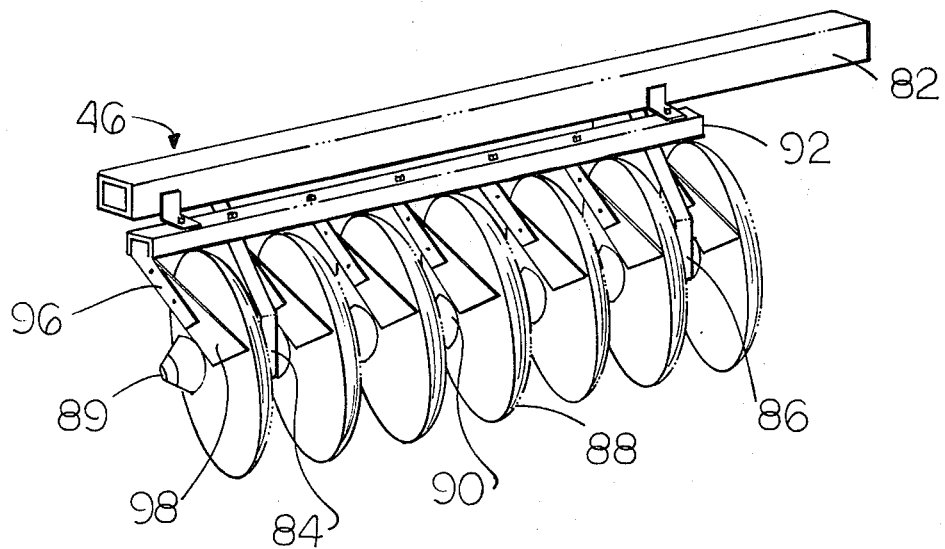
FIG. 4 is a perspective view of the front disc gang assembly utilized in the present device.

The front and rear disc gang assemblies 46 and 50 are approximately equidistantly spaced fore and aft of the center gang assembly 48, and each is constructed and arranged in a substantially similar manner. The front disc gang assembly 46 includes a gang tube or bar 82 having a pair of downwardly extending arm members 84 and 86, similar to the members 54, 56, and 58, positioned therealong for attaching to the plurality of equidistantly spaced disc blades 88 as shown in FIG. 4. The identically shaped disc blades 88, the axial support shaft 89, and the spacer spool members 90 are all constructed and assembled in a manner substantially similar to the members 60, 62, and 63 as previously described, except that, the total number of discs or disc blades 88 utilized in the front disc gang assembly 46 is approximately equal to one-half the total number of discs 60 utilized in the center disc gang assembly 48. In addition, the disc blade scraper assembly associated with the front disc gang assembly 46 including the scraper bar 92, the elongated openings 94, the scraper arm members 96, the scraper blades 98, and the means for attaching the same to the front gang bar 82 is constructed and arranged similarly to corresponding portions of the scraper assembly associated with the center disc gang assembly 48.

Unlike the center gang assembly 48, the front disc gang assembly 46 is pivotally attached to the forward portion of the side frame member 18 as will be hereinafter described and is likewise movable between a first position wherein all of the disc gang assemblies are disposed in parallel alignment with each other as shown in FIG. 5 and a second position angularly related thereto as shown in FIG. 2. A pair of U-shaped bracket members 102 and 104 are likewise positioned and mounted to the frame members 16 and 18 such as by the threaded members 105, substantially similar to the mounting of the bracket members 76 and 78. Like the center gang bar 52, the front gang bar 82 is positioned between the side frame members 16 and 18 and the bracket members 102 and 104 and extends through the spaces formed therebetween. The bracket member 102 includes a pivot pin member 100 (FIGS. 3 and 7) which is cooperatively engageable with the front gang bar 82 to permit rotational movement of the front disc gang assembly 46 thereabout. The pin member 100 is cylindrical in shape and may be attached to or integrally formed with the bracket member 102. Although use of the member 100 is generally preferred, any suitable pivot means may likewise be utilized in the practice of this invention. It is also anticipated that the front disc gang assembly 46 may be pivotally mounted directly to the side frame member 18.

It should be noted that one end portion of the gang bar 82 extends a sufficient distance beyond the innermost disc blade 88 so as to extent through and beyond the bracket member 104 as shown in FIGS. 2, 4, 5, and 7. Like the bracket members 76 and 78, the members 102 and 104 are likewise dimensioned lengthwise such that when the gang bar 82 is pivotally rotated about its pivot means 100, the front disc gang assembly 46 is angularly displaced from its in-parallel position (FIG. 5) so as to subtend an angle in the range from between approximately 0° to 20°. Since the gang bar 82 is pivotally mounted to the side frame member 18 as previously described, that portion of the bar 82 which extends through the bracket member 104 will traverse a greater angular displacement as compared to that portion of the bar 82 which extends through the member 102. For this reason, the bracket member 104 is greater in length as compared to the bracket member 102 as shown in FIGS. 3 and 7. Additionally, in order to achieve the desired direction of rotation of the front disc gang assembly 46 relative to the center gang assembly 48, the mounting brackets 102 and 104 are attached to their respective side frame members 16 and 18 such that the forward portions of each respective bracket are axially aligned and lie substantially adjacent to the forward portion of the gang bar 82 when said bar is in its in-parallel position as shown in FIG. 5. This arrangement of the members 102 and 104 enables the front disc gang assembly 46 to move in an angled relationship to the center disc gang assembly 48 as shown in FIG. 2. The scraper bar 92, like the scraper bars 64, is also positioned below the brackets 102 and 104 and does not interfere with or otherwise hinder the pivotal movement of the gang bar 82 within the bracket members 102 and 104.

The components comprising the rear disc gang assembly 50 are constructed and arranged similarly to corresponding portions of the front disc gang assembly 46 with the exception that the opposite end portion of the rear gang tube or bar 106, as compared to the gang bar 82, extends beyond the innermost disc blade 88 as clearly shown in FIG. 2. The rear disc gang assembly 50 is pivotally attached to the rear portion of the side frame member 16 in a manner similar to the attachment of the front disc gang assembly 46 to the side frame member 18, and the U-shaped bracket members 110 and 112 are likewise positioned and attached to the members 16 and 18 such as by the threaded members 113 in a manner similar to the attachment of the brackets 102 and 104 as previously described. Like the front and center disc gang assemblies 46 and 48, the rear disc gang assembly is also pivotally movable between a first position wherein all of the disc gang assemblies are disposed in parallel alignment with each other (FIG. 5) and a second position angularly related thereto (FIG. 2). The bracket member 110, like the member 102, also includes a cylindrical pivot pin member 108 (FIGS. 3 and 7) which is cooperatively engageable with the rear gang bar 106 to permit rotational movement of the rear disc gang assembly 50 thereabout. Similarly, the bracket members 110 and 112, like the members 102 and 104, are likewise dimensioned lengthwise such that when the gang bar 106 is pivotally rotated about its pivot means 108, the rear disc gang assembly 50 is angularly displaced from its in-parallel position (FIG. 5) so as to subtend an angle in the range from between approximately 0° to 20°. Like the member 104, the bracket member 112 is greater in length as compared to the bracket member 110 (FIGS. 3 and 7) for the reasons previously stated. In addition, in order that the rear disc gang assembly 50 may operate essentially in parallel with the front disc gang assembly 46, the bracket members 110 and 112 are mounted such that the rear portions of each respective bracket are axially aligned and lie substantially adjacent to the rear portion of the gang bar 106 when said bar is in its in-parallel position (FIG. 5). The bracket members 102, 104, 110, and 112, when arranged and dimensioned as hereinbefore described, will also allow pivotal movement of the front and rear disc gang assemblies 46 and 50 in a range from between approximately 0° to 20°. Although all of the U-shaped bracket members previously described are shown rigidly attached to the side frame members 16 and 18 by use of threaded members, any well-known suitable means for mounting these members to the members 16 and 18 may be utilized in the practice of this invention. It is also anticipated that the rear disc gang assembly 50 may be pivotally mounted directly to the side frame member 16 and it is likewise recognized that the scraper bars 64 and 92 may be integrally formed with their respective gang bar, if so desired.

Movement of the disc gang assemblies away from their respective in-parallel positions (FIG. 5) changes the working angle of the discing tools attached thereto relative to the soil. In accordance with one of the important features of the present invention, a relatively simple linkage mechanism including the pivotal arm members 114, 116, and 118, and a manually operable acuating lever or link 120 positioned on the forward portion of the front gang bar 82 is utilized for simultaneously pivotally rotating the disc gang assemblies 46, 48, and 50 to vary the aggressiveness of the disc blades relative to the soil as shown in FIGS. 1 and 2. The arm member 116 is rigidly attached to the center gang bar 52 and extends beyond both opposite sides thereof as shown in FIGS. 2, 5 and 6. The arm members 114 and 116 are pivotally attached to each other by any suitable pivot means such as by the pivot pin member 121, and the arm member 114 is pivotally attached at its opposite end portion to the front gang bar 82 such as by the pin member 122. In like manner, the opposite end portion of the arm member 116 is pivotally attached to one end portion of the arm member 118 such as by the pivot pin member 124, and the other end portion of arm member 118 is pivotally attached to the rear gang bar 106 such as by the pin member 126.

The actuating lever or link 120 is likewise pivotally attached at one end portion thereof to the front gang bar 82 such as by the pin member 128 and includes an aperture 130 positioned at its opposite end portion such that the aperture 130 may be easily and conveniently positioned in registration with means located on the side frame member 18 so that the angular displacement of the disc gang assemblies relative to their respective in-parallel positions (FIG. 5) may be selectively controlled. Such means includes a flange member 132 having a plurality of selected openings 134 positioned therethrough and the member 132 is rigidly mounted to the side frame member 18 by any suitable means so as to be readily accessible to the operator thereof as shown in FIGS. 2 and 5. The openings 134 are longitudinally aligned on the member 132 and each opening 134 is positioned so as to correspond to a particular angular orientation of the disc gang assemblies when the aperture 130 is placed in registration with one of the openings 134. Once so positioned, the aperture 130 may be easily held in registration with a pre-selected opening 134 by inserting an attachment lock pin (not shown) through the respective apertures 130 and 134. Movement of the operating lever or link 120, through the linkage means hereinbefore described, therefore simultaneously pivotally rotates all three disc gang assemblies 46, 48, and 50 and allows an operator to easily and conveniently adjust all of the disc gang assemblies at one time. Coupling together all of the disc gang assemblies for easy unitary adjustment as shown in the preferred embodiment of this invention greatly simplifies the overall adjusting operation and effectively reduces the overall time required for performing and accomplishing the adjusting task. This feature also enables an operator to selectively control the working angle of the various disc gang assemblies depending upon the soil conditions and the particular discing job involved.

In the illustrated embodiment shown in FIG. 2, it should also be noted that the linkage mechanism is operatively connected to the disc gang assemblies 46, 48, and 50 such that when the disc gang assemblies are angularly displaced away from their in-parallel positions (FIG. 5), the center disc gang assembly 48 operates in an angled relationship to the front and rear disc gang assemblies 46 and 50. This arrangement further promotes a full and complete working of the soil; it provides for a more aggressive cutting and mixing of the soil; it minimizes the formation of ridges and furrows; and it produces no net lateral displacement of the working soil. In addition, the linkage members 114, 116, and 118, and the operating lever or link 120 are so positioned and dimensioned lengthwise such that any angular displacement of one of the disc gang assemblies will automatically result in a substantially equal angular displacement of the remaining disc gang assemblies. For example, when the front disc gang assembly 46 is pivotally adjusted such that the working angle of the front disc gang assembly relative to its in-parallel position is equal to the angle A as shown in FIG. 2, the angular displacement of both the center and rear disc gang assemblies 48 and 50 respectively relative to their respective in-parallel positions is likewise approximately equal to the angle A. Maintaining the various disc gang assemblies at substantially equal working angles relative to the soil produces a more effective turning and intermixing of the soil which improves the overall effectiveness and efficiency of the discing operation.

The arrangement of the various disc gang assemblies and the working angle of the disc blades relative to the soil determine the amount and type of tillage required for a particular discing operation. As the actuating lever or link 120 is manipulated to change the angular displacement of the various disc gang assemblies relative to their in-parallel positions (FIG. 5), the working angle of the various disc blades relative to the soil likewise changes, the greater the working angle of the disc blades, the greater the amount of tillage performed. As aforementioned, positioning the actuating lever or link 120 to a desired selected position corresponding to one of the openings 134 allows the user to pre-position the disc gang assemblies to the desired working angle for a particular discing operation.

It is important to note that, in the preferred embodiment, both the front and rear disc gang assemblies 46 and 50 operate essentially in parallel with each other throughout their entire range of angular rotation, and both assemblies are offset laterally from the longitudinal axis of the implement 10 such that each assembly is positioned on laterally opposite sides of the center disc gang assembly 48 as shown in FIGS. 2 and 5. In particular, the front disc gang assembly 46 is positioned to traverse the soil immediately in front of the left-hand portion of the center disc gang assembly 48 and the rear disc gang assembly 50 is positioned to traverse the soil immediately behind the right-hand portion of the center disc gang assembly 48, the combined lengths of the discing tools 88 associated with both the front and rear disc gang assemblies being approximately equal to the length of the discing tools 60 associated with the center disc gang assembly. It is likewise anticipated that the front and rear disc gang assemblies including the bracket members 102, 104, 110 and 112 may be mounted in reverse order such that they are positioned on laterally opposite sides of the center disc gang assembly from that shown in FIGS. 2 and 5, and it is also anticipated that the bracket members 76 and 78 may likewise be mounted in reverse order such that the center disc gang assembly 48 may be rotated in the opposite direction from that shown in FIG. 2. This reverse arrangement will produce an implement having the mirror image of the implement 10.

It is also preferred, although not required, that the total number of discing tools 60 associated with the center disc gang assembly 48 be equal to the combined number of discing tools 88 associated with both the front and rear disc gang assemblies 46 and 50. It has also been found that a full, complete mixing of the soil is achieved by positioning the individual disc blades 88 so as to lie between adjacent disc blades 60 at a distance equal to approximately three-quarters ($\frac{3}{4}$) of the total distance between each respective disc blade 60. This specific offset arrangement of the discs 88 relative to the discs 60 ensures a full working of the soil and likewise ensures that the specific lateral working width of the center disc gang assembly 48 is approximately equal to the combined lateral working width of the front and rear disc gang assemblies regardless of the angular orientation of the respective disc gang assemblies. Additionally, all of the disc blades 88 on both the front and rear disc gang assemblies 46 and 50 are positioned such that the concave surfaces of each are directed so as to throw soil towards one lateral direction, while all of the disc blades 60 on the center disc gang assembly 48 are positioned such that the concave surfaces of each are directed so as to throw soil in an opposite lateral direction so that no net lateral displacement of the soil is realized. This specific arrangement of the discing tools 60 and 88 likewise provides for a complete mixing of the soil and enhances a final, smooth soil surface.

The overall width of the implement 10 is subject to wide variations and the present device can be constucted to accommodate any particular cutting or working width desired. Conceivably, large commercial units may be utilized in the practice of this invention. However, it is anticipated that the primary utilization of the present device will be as a small discing implement for use in combination with small horsepower tractors and other similar towing vehicles. It is therefore preferred that the subject device 10 be constructed so as to have an ASAE cutting or working width in the range from approximately 4 ft. 10 in. to approximately 8 ft. 5 in., although other cutting widths are also possible. This particular range of cutting widths produces an easily maneuverable implement which can be easily transported from one location to another by simply raising the implement through the power operated lift attachment on the towing vehicle and, because of its overall size, the subject implement does not require foldable wing frame assemblies and other complicated and cumbersome features commonly associated with relatively large disc harrows. This is not to say that relatively large commercial units of the present device are not anticipated and, if such units are constructed, it is also recognized that these units may be manufactured to include hydraulically assisted foldable wing frame assemblies to reduce the overall width of the present device when it is to be stored or tranported.

Although the preferred embodiment of the present invention as disclosed herein includes means whereby all three disc gang assemblies may be simultaneously adjusted to vary the aggressiveness of the disc blades with the soil, it is important to note that any suitable means for pivotally adjusting the angular position of the disc gang assemblies may be utilized in the practice of this invention so long as the disc gang assemblies are constructed and positioned as aforementioned such that the lateral working width of the center disc gang assembly 48 remains substantially equal to the combined working width of the front and rear disc gang assemblies 46 and 50 regardless of the angular orientation of the individual disc gang assemblies. It is also important to note that each of the disc gang assemblies 46, 48 and 50 may be pivotally mounted to the support frame assembly 12 so as to be independently adjustable relative to each other. This may be accomplished by pivotally attaching a link member, such as the member 120, to each respective gang bar in such a position that each respective link member may be easily placed into engagement with respective means located on the support frame assembly, such as the flange member 132, so that the angular displacement of each disc gang assembly may be selectively controlled. This alternative arrangement for pivotally adjusting the disc gang assemblies allows an operator to independently selectively adjust each of the disc gang assemblies to any desired angular orientation, within limits, relative to each other depending upon the type of tillage required for a particular discing operation. It also enables a user to pre-position the front and rear disc gang assemblies 46 and 50 such that they do not necessarily operate in parallel with each other throughout their entire range of angular rotation, if so desired. Although simultaneous movement of all three disc gang assemblies is generally preferred, this alternative mechanism for individually adjusting the disc gang assemblies works equally as well so long as the configuration and positioning of the three disc gang assemblies is maintained as aforementioned.

Thus, there has been shown and described a novel offset disc harrow for use in conjunction with conventional tractors and other similar towing vehicles for performing a wide variety of varying discing operations, which disc harrow construction fulfills all of the objects and advantages sought therefor. Many changes, modifications, variations, and other uses and applications of the present disc harrow construction will, however, become apparent to those skilled in the art after considering this specification and the accompanying drawings. All such changes, modifications, variations, and other uses and applications which do not depart from the spirit and scope of the invention are deemed to be covered by the invention, which is limited only by the claims which follow.

What is claimed is:

1. An agricultural implement for tilling soil comprising a support frame assembly having means associated therewith for coupling to a conventional towing vehicle, a first disc gang assembly pivotally mounted to the forward portion of said support frame assembly, a second disc gang assembly pivotally mounted to the rear portion of said support frame assembly, said first and second disc gang assemblies being positioned on laterally opposite sides of said support frame assembly and each including a plurality of spaced discing tools, a third disc gang assembly pivotally mounted to said support frame assembly in spaced apart relationship between said first and second disc gang assemblies, said third disc gang assembly including a plurality of spaced discing tools positioned such that the lateral working width of said third disc gang assembly is approximately equal to the combined lateral working width of said first and second disc gang assemblies, each of said disc gang assemblies being pivotally movable between a first position and a second position angularly related thereto, and means for simultaneously pivotally adjusting the angular position of all of said disc gang assemblies to vary the working angle of the discing tools relative to the soil including an actuating arm lever pivotally attached to one of said disc gang assemblies and a plurality of pivotal arm members operatively interconnecting said first, second, and third disc gang assemblies, operation of said simultaneous adjustment means effecting simultaneous movement of said disc gang assemblies such that said first and second disc gang assemblies move substantially in parallel with each other and said third disc gang assembly moves in an angled relationship thereto.

2. The agricultural implement defined in claim 1 wherein said disc gang assemblies are pivotally movable in a range from between approximately 0° to 20°.

3. The agricultural implement defined in claim 1 wherein each of the discing tools of said first and second disc gang assemblies are positioned to lie between adjacent discing tools of said third disc gang assembly at a distance approximately equal to three-quarters of the total distance between each respective discing tool of said third disc gang assembly.

4. The agricultural implement defined in claim 1 wherein said actuating arm lever is pivotally attached to said first disc gang assembly and attachable to said support frame assembly at spaced, fixed positions therealong for selectively controlling the angular displacement of said disc gang assemblies, said plurality of pivotal arm members including three arm members pivotally connected approximately end-to-end with one another and lying generally in a horizontal plane, each disc gang assembly being pivotally connected to a respective one of said pivotal arm members such that when said disc gang assemblies are pivotally rotated to a selected angular position relative to their respective first positions, the angular displacement of each of said disc gang assemblies from said first positions is substantially equal.

5. The agricultural implement defined in claim 1 wherein the discing tools associated with said first and second disc gang assemblies are adaptable to throw soil in one lateral direction and the discing tools associated with said third disc gang assembly are adaptable to throw soil in an opposite lateral direction thereto.

6. The agricultural implement defined in claim 1 wherein said third disc gang assembly is equidistantly spaced between said first and second disc gang assemblies.

7. An agricultural implement for tilling soil comprising a support frame assembly having a hitch arrangement associated therewith for coupling to a conventional towing vehicle, a first disc gang assembly pivotally mounted to the forward portion of said support frame assembly, a second disc gang assembly pivotally mounted to the rear portion of said support frame assembly, said first and second disc gang assemblies being positioned on laterally opposite sides of the longitudinal axis of said support frame assembly and each of said assemblies including a plurality of spaced discing tools adaptable to throw soil in the same lateral direction, a third disc gang assembly pivotally mounted to said support frame assembly in spaced apart relationship between said first and second disc gang assemblies, said third disc gang assembly being approximately equidistantly positioned between said first and second disc gang assemblies and including a plurality of spaced discing tools adaptable to throw soil in an opposite lateral direction from that of said first and second disc gang assemblies, the lateral working width of said third disc gang assembly being approximately equal to the combined lateral working width of said first and second disc gang assemblies, each of the said discing tools of said first and second disc gang assemblies being positioned to lie between adjacent discing tools of said third disc gang assembly at a distance substantially equal to three-quarters of the total distance between each respective discing tool of said third gang assembly, each of said disc gang assemblies being pivotally movable between a first position wherein all of said disc gang assemblies are disposed in parallel relationship with each other and a second position angularly related thereto, operator means for simultaneously pivotally rotating all of said disc gang assemblies to vary the working angle of the discing tools relative to the soil, said operator means including simultaneous adjustment means operatively engagable with said disc gang assemblies whereby said first and second disc gang assemblies move substantially in parallel with each other and said third disc gang assembly moves in an angled relationship thereto, said simultaneous adjustment means including an actuating lever pivotally attached at one end portion thereof to said first disc gang assembly and extending forwardly therefrom toward the front of said implement, said simultaneous ajustment means also including three arm members pivotally connected one to another adjacent the ends thereof, each disc gang assembly being pivotally connected to a respective one of said pivotal arm members, said simultaneous adjustment means further including means for selectively controlling the angular displacement of said disc gang assemblies, and means for limiting the rotational movement of said disc gang assemblies in a range from between approximately 0° to 20°, operation of said operator means effecting simultaneous movement of said disc gang assemblies such that when said disc gang assemblies are pivotally rotated to a selected angular position, the angular displacement of each of said disc gang assemblies from their respective in-parallel positions is substantially equal.

8. The agricultural implement defined in claim 7 wherein said means for limiting the rotational movement of said disc gang assemblies includes a plurality of substantially U-shaped bracket members attached in spaced apart relationship to said support frame assembly, said bracket members being arranged in pairs and dimensioned lengthwise such that a portion of each disc gang assembly can be respectively disposed through a corresponding one of said pairs of bracket members such that when said disc gang assemblies are pivotally rotated respectively therewithin said disc gang assemblies subtend an angle in the range from between approximately 0° to 20°.

9. The agricultural implement defined in claim 7 wherein said means for selectively controlling the angular displacement of said disc gang assemblies includes an aperture positioned adjacent to and extending through the opposite end portion of said actuating lever, a flange member attached to the forward portion of said support frame assembly, said flange member having a plurality of openings extending therethrough, said plurality of openings being longitudinally aligned on said flange member such that when the aperture on said actuating lever is placed in registration with one of said longitudinally aligned openings a particular angular displacement of said disc gang assemblies is achieved, and means for releasably holding the aperture on said actuating lever in registration with said one of said plurality of longitudinally aligned openings, each of said longitudinally aligned openings on said flange member being positioned so as to correspond to a different angular displacement of said disc gang assemblies.

* * * * *